United States Patent [19]

Speer

[11] Patent Number: 4,659,525

[45] Date of Patent: * Apr. 21, 1987

[54] DASHBOARD REPAIR METHOD

[76] Inventor: Lawrence L. Speer, 6585 Boneta Rd., Medina, Ohio 44256

[*] Notice: The portion of the term of this patent subsequent to Apr. 9, 2002 has been disclaimed.

[21] Appl. No.: 797,047

[22] Filed: Nov. 12, 1985

[51] Int. Cl.$^4$ ............................................. B32B 35/00
[52] U.S. Cl. ........................................ 264/36; 156/98
[58] Field of Search ............................ 264/36; 156/98

[56] References Cited

U.S. PATENT DOCUMENTS

| | | | |
|---|---|---|---|
| 3,713,926 | 1/1973 | Speer | 156/98 |
| 3,810,801 | 5/1974 | Speer | 156/94 |
| 3,887,413 | 6/1975 | Speer | 156/94 |
| 3,920,497 | 11/1975 | Speer | 156/94 |
| 3,926,895 | 12/1975 | Britain | 260/30.4 R |
| 4,013,495 | 3/1977 | Golumbic | 156/98 |
| 4,028,160 | 6/1977 | Golumbic | 156/98 |
| 4,181,547 | 1/1980 | Speer | 156/98 |
| 4,510,001 | 4/1985 | Speer | 156/98 |

Primary Examiner—Jan Silbaugh
Assistant Examiner—Karen D. Kutach
Attorney, Agent, or Firm—Willian Brinks Olds Hofer Gilson & Lione

[57] ABSTRACT

A method for repairing damaged dashboards and similar articles is disclosed. The method comprises the steps of trimming away damaged material to form a repair area, substantially filling the repair area with an air drying repair compound, allowing said repair compound to air dry, adding a polyester resin to a plastisol material to produce a heat curable repair compound, applying the heat curable repair compound over the air drying repair compound and applying heat to the heat curable repair compound to cure it. The method produces a repair which closely matches the hardness of vinyl and similar plastic materials which are conventionally used to cover dashboards.

5 Claims, 8 Drawing Figures

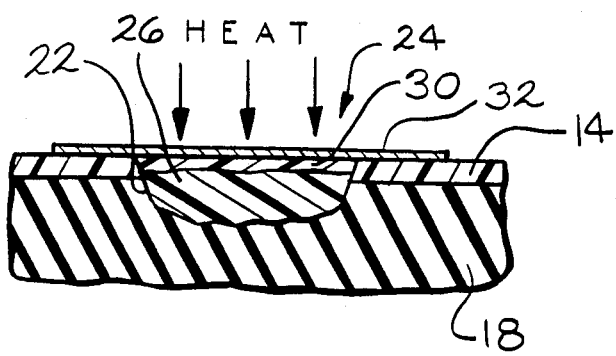
FIG. 7
FIG. 8
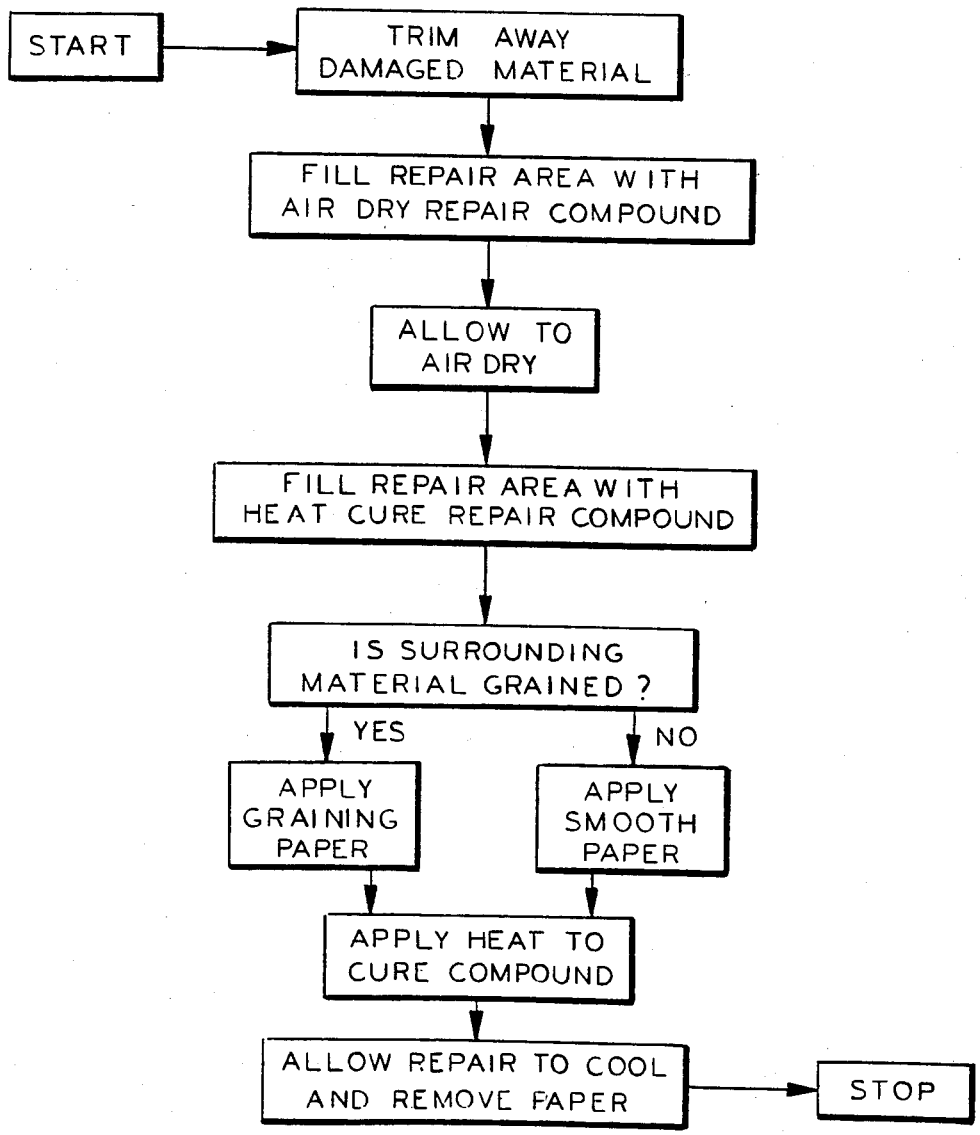

DASHBOARD REPAIR METHOD

BACKGROUND OF THE INVENTION

The invention relates generally to a compound and method for repairing damaged plastic and vinyl covered vehicle dashboards and, more specifically, to repair compounds and a two-step repair method for repairing damaged dashboards covered with plastic, vinyl and other similar materials.

Plastic materials such as vinyl have been widely accepted for use as a covering for automobile dashboards. Vinyl and similar plastic materials are advantageous in this application because they are impervious to water, they remain flexible over a broad range of temperatures and they can be produced in a wide variety of colors and finishes.

The use of vinyl materials and the like as a cover for dashboards in automobiles and other vehicles is substantial. Since in such service it will generally be used for an extended period of time, the likelihood of eventual damage is great. Objects such as automobile keys, pens, pencils and toys or heated objects such as matches or cigarettes are obvious causes of such damage. In spite of the fact that such damage may be confined to a small area, the area of the damage is bound to be in an exposed, highly visible region of the vehicle. In spite of the high visibility of such damage, the expense of replacing the entire plastic panel containing the damaged dashboard discourages most consumers from this type of repair. Such damage thus goes unrepaired serving as the situs for tearing and further damage of the dashboard and lowering the overall value of the car or other vehicle.

I have devoted my life to developing materials and methods for effecting repairs on plastic and vinyl articles. For example, in 1973 I obtained U.S. Pat. No. 3,713,926 for a basic process for the in-situ repair of vinyl material. This process comprehends the filling of a damaged area with a heat curable material of 70 percent polyvinyl acetate and 30 percent plasticizer. A graining paper is placed over the patch and sufficient heat is applied to cure the repair compound. My invention disclosed and claimed in U.S. Pat. No. 3,887,413 teaches another, more sophisticated method of vinyl repair which includes the use of a protective paste which is dispersed on the surface of the undamaged material adjacent the damaged area. U.S. Pat. No. 3,975,558 also utilizes a heat insulating paste. A repair method utilizing a heat transfer tool is described in my U.S. Pat. No. 4,181,547. From the foregoing, it is apparent that I have expended substantial effort with relation to materials and processes directed to the repair of vinyl, leather and similar materials.

The field of vinyl repair is an expanding and increasingly sophisticated industry as evidenced by the patent activity of others. U.S. Pat. No. 4,013,495 relates to a method for repairing pigmented and textured flexible material wherein a plurality of thin layers of liquid vinyl repair compound are serially applied and heat cured. U.S. Pat. No. 4,028,160 describes another method wherein precured plastic material is cut into edge abutting patches and used thereto. U.S. Pat. No. 4,086,113 discloses the use of precured patch material, as disclosed in the previous patent, in a preformed patch which is larger than the area of the damaged portion such that it overlaps the damage. The patches are fused to the surrounding undamaged material.

In spite of the innovation of myself and others, certain difficulties still exist. One of the most formidable areas of difficulty relates to the attainment of satisfactory curing and bonding of the repair material. This difficulty is the manifestation of a general problem relating to the proper application of heat. In the processes I have developed, it is frequently difficult to provide an appropriate quantity of heat to properly cure all of the vinyl repair compound in a large and thick area of damage. If the vinyl repair compound has not properly cured, due to insufficient heat application, the service life of the patch will be reduced since the material will not achieve appropriate toughness and the bonding achieved with the adjacent material will be less than optimum which may result in separation of the patch material from the surrounding undamaged material. Excessive application of heat, while ensuring complete curing and bonding of the patch material, will invariably destroy the grain texture of the surrounding material or distort it. Clearly, those processes utilizing precured patch material are intended to alleviate the problems attendant insufficiently cured repair material. However, heat application then becomes an even more exacting process since insufficient heat will result in an insufficient bond between the patch and the surrounding material. Generous heat application such as may be frequently needed to achieve melting and bonding of the patch to the surrounding material may, unfortunately, result in damage to the pattern thereof and distortion of the material just as in processes where heat curing repair materials are utilized.

Beyond the foregoing difficulties, dashboard repair presents a problem relative to matching the hardness of the repair compound, after curing, to that of the surrounding, undamaged dashboard material. The latter is harder than plastic materials, such as vinyl, which are utilized in so many applications including upholstery, luggage, purses and footwear, for which most repair compounds and methods have been developed. Accordingly, currently available vinyl repair compounds are not suited for dashboard repair because the resultant repair patch is significantly softer than the cover material on dashboards.

SUMMARY OF THE INVENTION

From the foregoing, it becomes apparent that improvements are possible and that a process which is capable of achieving a secure bond between the patch material and the surrounding undamaged material but which also requires a minimum of heat application would be desirable. The instant invention responds to such need. It includes two repair compounds and a two-step dashboard repair process which overcomes many of the above-described shortcomings of previous repair approaches. One of the repair compounds is an air-dry repair compound. The air-dry repair compound is of a paste-like consistency, and cures without the application of heat thereto. The second repair compound comprises a plastisol to which additional resin has just been added. The repair process comprehends the following steps: trimming away the damaged material to provide secure, undamaged edges to which the repair compound will adhere, filling most or all of the trimmed repair area with the air-dry repair compound so that it is flush or nearly so with the surrounding undamaged material. The repair compound is allowed to air dry and cure. As it cures, the compound shrinks somewhat so that it is recessed from the surface of the undamaged portion of the dashboard. The second repair compound, comprising a vinyl resin and a conventional heat curable plastisol resin is used to fill in the recess until it is flush with the level of the surrounding undamaged material. The second repair compound may be tinted or colored to match the color of the surrounding material. If grain on the repair is necessary, graining paper of the appropriate texture is placed over the repair air and heat is applied to cure the second repair compound. If heat is supplied by a heat tool but no grain is desired, a smooth release paper may be applied over the repair area but if no grain is needed and the heat is supplied by a hot air tool, no paper is necessary. When the patch is cool, the graining paper, if used, may be removed. A strong, secure repair which is well bonded to the surrounding material has thus been achieved.

It is thus an object of the instant invention to provide a dashboard repair compound which bonds securely to the surrounding undamaged dashboard material.

It is a further object of the instant invention to provide a dashboard repair compound which does not require the application of heat in order for it to cure, but rather, is air drying.

It is a further object of the instant invention to provide a method of dashboard repair generally utilizing a first air drying repair compound and a second, heat curable repair compound, the hardness of which can be controlled to match that of a dashboard cover.

It is a still further object of the instant invention to provide a method of dashboard repair which requires less heat application than prior art methods and thus reduces the likelihood of damage to the surrounding material.

Further objects and advantages of the instant invention will become apparent by reference to the following description of the preferred embodiment and appended drawings.

BRIEF DESCRIPTION OF THE DRAWINGS

FIG. 7 is a fragmentary, full sectional view of the repair area wherein a surface treating paper has been applied to the repair; and FIG. 8 is a flow chart generally diagramming the various steps of the instant repair method.

DESCRIPTION OF THE PREFERRED EMBODIMENT

Figure 1:
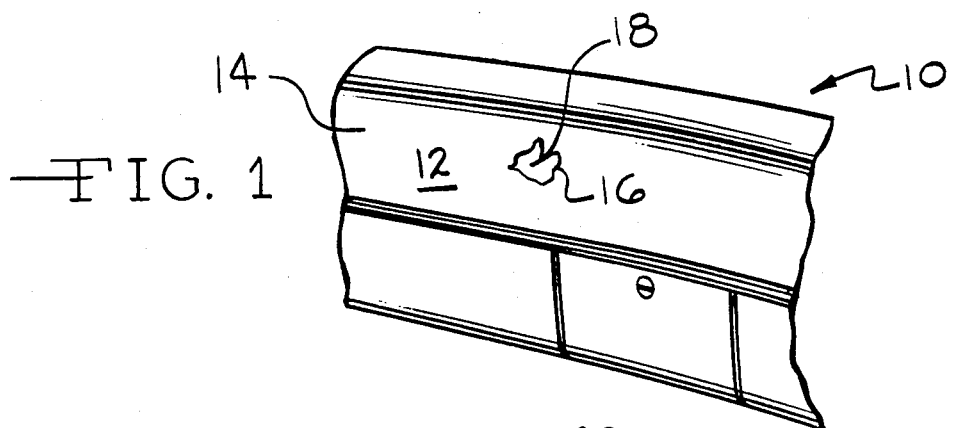
FIG. 1 is a fragmentary, perspective view of a dashboard covered with a vinyl or plastic material which has been damaged.
Figure 2:
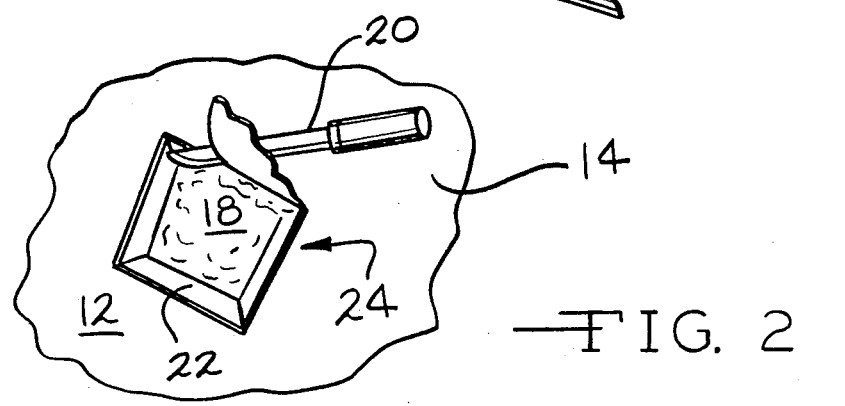
FIG. 2 is a top plan view of a damaged dashboard undergoing the first step of the repair process, that is, trimming away of the damaged material.
Figure 3:
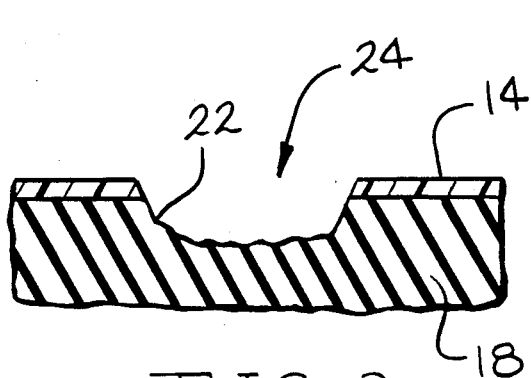
FIG. 3 is a fragmentary, full sectional view of the trimmed repair area.

With reference to FIG. 1, a conventional dashboard is indicated generally at 10. An upper section 12 of the dashboard 10 is covered with a layer 14 comprising plastic, vinyl or the like material. A damaged area 16 appears in the upper section 12. In the damaged area 16, the damage extends through the layer 14 and into a base material 18 which may comprise, for example, a relatively hard, foam material. Regardless of the size of the damaged area 16, the first step of the repair method according to the instant invention involves the removal of any loose or unsecure portions of the upper section 12 of the dashboard 10 in the vicinity of the damaged area 16. A suitable cutting tool, for example, a knife 20 (FIG. 2) is used to trim away the loose or unsecure portions of the upper section 12 of the dashboard 10. The trimming produces clean surfaces 22 which are secure and uniform and define a trimmed repair area 24 which is shown in cross section in FIG. 3.

Figure 4:
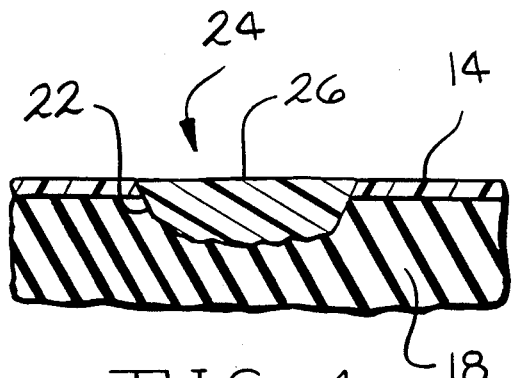
FIG. 4 is a fragmentary, full sectional view of the repair area wherein the repair area has been filled flush with the level of the adjacent surface with the air drying repair compound of the instant invention.

The next step of the repair process is to fill the trimmed repair area 24 with an air drying repair compound 26 (FIG. 4) of a composition to be described subsequently. Preferably, the repair compound 26 is applied to the trimmed repair area 24 with a spatula or similar tool such that all regions within the trimmed repair area 24, and particularly those adjacent the edge 22, are filled with the repair compound 26. The trimmed repair area 24 is filled, preferably completely, with the repair compound 26 to a level which is flush with the level of the surrounding undamaged material 14. The repair compound 26 is then permitted to completely air dry and cure.

Figure 5:
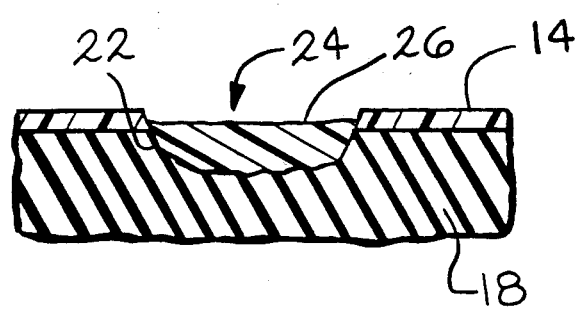
FIG. 5 is a fragmentary, full sectional view of the repair area in which the repair compound has air dried and shrunk.

Referring now to FIG. 5, it will be appreciated that due to evaporation of the volatile substances within the repair compound 26, as it air dries, it will undergo dimensional reduction. Subsequent to complete air drying, the repair compound then will be at a level somewhat below the surface level of the surrounding material 14 as illustrated.

Figure 6:
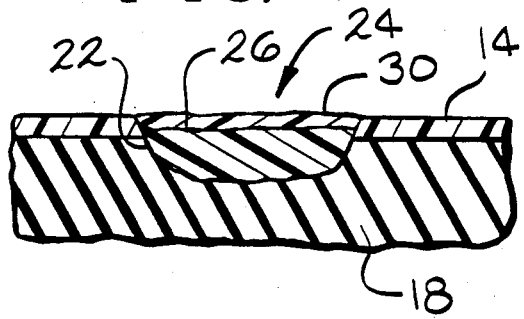
FIG. 6 is a fragmentary, full sectional view of the repair area wherein a layer of heat curable repair compound has been applied over the cured air dry repair compound within the repair area and flush with the level of the adjacent undamaged surface.

Referring now to FIG. 6, the depression which was created by the shrinkage accompanying the air drying of the repair compound 26 is next filled with a heat curable repair compound 30, the composition of which is described subsequently. The repair area 24 is filled flush with the level of the surrounding material 14. It should be understood that appropriate coloring pigment or pigments may and should be added to the repair compound 30 prior to its application within the repair area 24 such that a color match with the material of layer 12 is achieved.

FIG. 7 relates to the final steps of the repair process which relate, generally, to the curing of the repair compound 30 and surface treatment of the repair compound 30 to provide a surface finish thereon equivalent or similar to the surface finish of the material 14.

If the surface of the material 14 is smooth, a smooth release paper 32 may be applied by direct application such as through the use of a heated repair tool. If the surface of the surrounding material 14 is smooth but heat is to be applied through the use of a device (not shown) supplying a stream of hot air, no release paper 32 need be applied to the repair area 24. A suitable device for applying a stream of hot air is disclosed in my U.S. Pat. No. 4,260,439, which is incorporated herein by reference.

Alternatively, if the surrounding material is grained and the repair area 24 must like include a grained surface in order to properly match it, a suitably textured grained release paper 32 must be placed over the repair area and, if possible, registered with like features of the grain of the surrounding material 14. Heat is then applied to cure the heat curable repair compound 30 according to conventional practices which could include, the use of a heat gun, micro heat beam hot air tool, heated iron (different sizes and tips) as well as the heat transfer tool described in my U.S. Pat. No. 4,181,547, which is incorporated herein by reference. When sufficient heat has been applied to completely cure the repair compound 30, the heat source is removed and the compounds 26 and 30 within the repair area 24 are allowed to cool. Finally, the smooth or grained release paper 32 is removed, thus completing the repair process.

It should be readily appreciated that this new dashboard repair process provides significantly improved results over prior art processes since only a relatively small proportion of the repair consists of a heat curable heat repair compound, a minimal quantity of heat need be applied to the repair area 24, significantly reducing the possibility of damage to the surrounding undamaged material 12.

The air drying vinyl repair compound 26 is of a new and unique composition which tightly bonds to the edges 22 of the repair area 24 to form a rugged and highly serviceable repair and base for the repair compound 30 but which does not require the heat curing of many prior art vinyl repair compounds and the attending possibility of damage to the surrounding material 14. Ranges of constituents of the air drying repair compound 26 are given below in Table I and the preferred composition of the repair compound 26 is given below in Table II.

TABLE I

| COMPOSITIONAL RANGES OF REPAIR COMPOUND 26 | |
|---|---|
| Polyester | 86–94 percent |
| Methylethylketone peroxide | 6–14 percent |

TABLE II

| PREFERRED COMPOSITION OF REPAIR COMPOUND 26 | |
|---|---|
| Polyester Resin | 91 percent |
| Methylethylketone peroxide | 9 percent |

The preferred polyester resin is available commercially, from Reichold Chemical Company under the trade designation 94-013. Methylethylketone peroxide is comercially available from a number of sources. These materials can be pre-mixed and stored until a need to use them arises.

The repair compound 30 is a heat curable resin material which, when cured, has a hardness which is very close to that of conventional dashboard cover materials. Compositional ranges for the constituents of the repair compound 30 are set forth below in Table III and the preferred composition therefore is set forth below in Table IV:

TABLE III

| COMPOSITIONAL RANGES OF REPAIR COMPOUND 30 | |
|---|---|
| Conventional Plastisol Material | 55–80 percent |
| Vinyl Resin | 20–45 percent |

TABLE IV

| PREFERRED COMPOSITION OF REPAIR COMPOUND 30 | |
|---|---|
| Conventional Plastisol Material | 65 percent |
| Vinyl Resin | 35 percent |

The plastisol material is one which I have developed and disclosed in my U.S. Pat. No. 3,713,926. The preferred composition of the plastisol material is 70 percent of finely divided powdered polyvinyl chloride acetate and 30 percent of a plasticizer, preferably, diethylhexyl phthalate. The plastisol material has a consistency like that of a soft paste. The plastisol, when it is heat cured, is very flexible and pliable. The preferred vinyl resin, according to the instant invention, is commercially available from Diamond Shamrock under the designation DR-450. When the components of the repair compound 30 are mixed, it must be applied, almost immediately, to a repair area. The preferred composition of repair compound 30 has the consistency, immediately after mixing, of a heavy paste but is, nonetheless, spreadable. Upon the mixing together of the constituents of repair compound 30, however, it begins to harden and, within one hour of mixing, it will be too hard to be applied to a repair area. Accordingly, the constituents of repair compound 30 cannot be pre-mixed but, rather, should be mixed just prior to use.

I claim:

1. A method of repairing a damaged dashboard or similar article, said method comprising the steps of:
   trimming away damaged material to form a repair area in the undamaged material,
   substantially filling said repair area with an air drying repair compound,
   allowing said repair compound to air dry,
   applying, over said air drying repair compound, a heat curable repair compound comprising from 55 to 80 percent of a plastisol compound having a consistency like that of a soft paste and from 20 to 45 percent of a polyester resin and wherein, just prior to application of the heat curable repair compound, the constituents thereof are first mixed together,
   applying heat to said heat curable repair compound to cure said compound.

2. The vinyl repair method of claim 1 further including the step of placing a release paper over the heat curable repair compound prior to applying heat thereto.

3. The vinyl repair method of claim 1 wherein a grained release paper is placed over said heat curable repair compound prior to curing said heat curable repair compound.

4. The repair method of claim 1 wherein the heat curable repair compound comprises 65 percent of a plastisol compound having a consistency like that of a soft paste and 35 percent of a polyester resin.

5. The repair method of claim 1 wherein the air drying repair compound comprises 91 percent of a polyester resin and 9 percent of methylethylketone peroxide.

* * * * *